United States Patent [19]

Binder et al.

[11] Patent Number: 4,903,957
[45] Date of Patent: Feb. 27, 1990

[54] DYNAMICALLY STABLE SHEET CLAMPING SYSTEM FOR HIGH SPEED SHEET HANDLING DRUMS

[75] Inventors: Alan M. Binder, Lexington; Walter P. Haimberger, Topsfield; Theodore J. LaBelle, Dorchester; Kenneth A. McAuley, Boston, all of Mass.

[73] Assignee: Polaroid Corporation, Cambridge, Mass.

[21] Appl. No.: 265,994

[22] Filed: Nov. 2, 1988

[51] Int. Cl.⁴ .............................................. B65H 5/04
[52] U.S. Cl. ...................................... 271/277; 271/82; 101/411; 346/138
[58] Field of Search ................. 101/409–412; 346/138; 271/277, 82, 204–206

[56] References Cited

U.S. PATENT DOCUMENTS

| | | | |
|---|---|---|---|
| 2,099,820 | 11/1937 | Meyer | 271/82 |
| 2,622,000 | 12/1952 | Thompson | 346/138 |
| 4,386,771 | 6/1983 | Lakdawala | 271/277 |
| 4,390,176 | 6/1983 | Kato | 271/277 |
| 4,501,415 | 2/1985 | Loebach | 271/277 |
| 4,824,096 | 4/1989 | Fichter et al. | 271/277 |

FOREIGN PATENT DOCUMENTS 140951  6/1987  Japan ................................. 271/277

Primary Examiner—H. Grant Skeggs
Attorney, Agent, or Firm—Karl Hormann

[57] ABSTRACT

A sheet clamping system for high speed rotatable drums is provided in which light-weight clamping bars, formed of relatively thin metal sheet stock, are configured and/or oriented for maximum resistance to deflection radially of the axis of drum rotation as well as positively secured in a sheet medium clamping position at axially spaced intervals along the length of the drum. The system further includes centrifugally actuated, axially extending rods positioned to underlie the operative portion of each clamping bar in a manner such that leading and trailing edges of a retained sheet are sandwiched between the rods and the clamping bars under a clamping force generally proportional to the square of drum rotational speeds.

14 Claims, 3 Drawing Sheets

FIG. I

DYNAMICALLY STABLE SHEET CLAMPING SYSTEM FOR HIGH SPEED SHEET HANDLING DRUMS

BACKGROUND OF THE INVENTION

This invention relates to improvements in sheet clamping apparatus for high speed sheet handling drums and, more particularly, it concerns a light-weight arrangement of axially orientated, drum-carried clamping bars by which the leading and trailing edges of sheet media may be secured firmly along the full length of each such edge by any of several forms of actuating mechanisms supported independently of the drum.

Laser printing technology has developed to a stage where high resolution continuous tone images of a quality commensurate with or superior to those now provided by chemical processing of photographic sheet materials may be produced. In general, laser printing requires modulated laser light to be focused to a point in a sheet medium contained focal plane which must be held to within a fraction of a micrometer to optimize the resolution attainable in the laser modulated light. The focused laser light must then traverse the entire area of the image to be formed in a series of contiguous tracks or lines. This latter operation is ideally formed by supporting the sheet medium about the cylindrical periphery of a rotating drum and traversing the axial dimension of the medium with the focus point of the modulated laser light. Because of the large number of tracks which must be traversed, the time required to record an image on the sheet medium in this manner is almost entirely a function of the speed at which the medium is moved by the drum.

To be cost effective in relation to more conventional techniques for forming continuous images on sheet media, the laser printing operation is preferably carried out at drum speeds on the order of 1500–6000 rpm. At such speeds, centrifugal forces acting on the sheet medium tend to separate the medium radially from the peripheral surface of the drum to a degree giving rise to displacement of the medium as well as tangential forces acting upon the clamped margins of the medium. It is important, therefore, that the mechanism used to secure the medium to the drum be capable of resisting such forces. In addition, dynamic balance of the drum at such high speeds requires that the drum carried clamping mechanism be embodied in an assembly of components which is maintained balanced during drum rotation. At the same time, the clamping mechanism must be capable of resisting movement and/or deflection, or compensate therefor, under the centrifugal forces incurred.

While the problems of retaining a sheet against the centrifugal forces developed by carrying the sheet on a high speed rotating drum have been addressed in such relatively low tolerance applications as sanding drums and the like, the clamping arrangements employed in the prior art are relatively complicated and incapable of maintaining the sheet medium on a drum in a predictable relationship required by the optics of a laser printing system. In a commonly assigned copending application Ser. No. 034,665, filed Apr. 6, 1987, the problem associated with retaining sheet clamping bars against displacement under centrifugal force during drum rotation at speeds on the order of 1600 rpm are addressed. In the disclosure of this application, pivotal centrifugally actuated members are employed to draw the central portion of the sheet clamping bars inwardly in opposition to the centrifugal force. The approach represented by the disclosure of the afore-mentioned co-pending application is satisfactory for the drum revolution speeds contemplated by that disclosure. However, the relatively moveable organization of components supported by the drum gives rise to problems associated with balancing the drum at speeds in excess of 1.600 rpm, possibly up to 6000 rpm.

In light of the current state of the art relative to drum clamping arrangements for retaining sheet media about the periphery of the drum and the commercial potential of laser technology applications in the production of continuous tone images, there is need for an improved apparatus for securing a sheet medium to a high speed drum without concern for displacement of the sheet medium or the clamps from a predictably precise radial as well as tangential position on the drum.

SUMMARY OF THE INVENTION

In accordance with the present invention, a sheet clamping system for high speed rotatable drums is provided in which light-weight clamping bars, formed of relatively thin metal sheet stock, are configured and/or oriented for maximum resistance to deflection radially of the axis of drum rotation as well as positively secured in a sheet medium clamping position at axially spaced intervals along the length of the drum. The system further includes centrifugally actuated, axially extending rods positioned to underlie the operative portion of each clamping bar in a manner such that leading and trailing edges of a retained sheet are sandwiched between the rods and the clamping bars under a clamping force generally proportional to drum rotational speeds squared.

In a preferred embodiment, the clamping system includes a mounting channel having a pair of inwardly diverging flanges joined at a common web secured to the drum near the cylindrical periphery. The drum is formed with divergent slots along its length to receive the mounting channel flanges in this orientation. To each of the mounting channel flanges, an assembly of an axially slidable actuating bar and a radially adjustable clamping bar is secured by headed pins extending through axial and radial slots in the respective actuating and clamping bars to provide for such movement. Each actuating bar carries transverse pins which engage spaced axial slots in the mounting channel flange and correspondingly spaced axially inclined slots in the clamping bar. Thus, axial movement of the actuating bars operates to cam the clamping bars between operative retracted sheet clamping positions and radially extended positions for loading a sheet on to the drum.

The centrifugal force responsive rods are supported by means permitting the rods to move radially of the drum, such as, for instance, resilient leaf springs attached to the mounting channel web and which extend through aperture windows in the clamping bars to support the rods under a clamping lip of each clamping bar. In a relaxed condition of the springs supporting the rods, the rod surfaces lie substantially in the cylindrical periphery of the drum so that in the clamping position of the clamping bars, the clamping lips thereof will lightly engage the rods. Thus when a sheet medium is loaded onto the drum, opposite ends of the same will be positioned over the rods so that when the clamping bars are moved to their operative clamping position, the ends of the sheets are sandwiched between the rods and the clamping bar lips. During rotation of the drum the centrifugal force acting upon the rods and, hence, against the clamped margins of the sheet medium, compensates for the tangential forces tending to remove the margins from their clamps. The rods prevent tangential forces acting upon the sheet margins, from dislodging the sheet from the clamp. The centrifugal force acting on the rods is proportional to the square of the rotational speed of the drum.

In a preferred embodiment, a system is provided by means of which a sheet of medium may be wrapped around the cylindrical surface of the drum and clamped thereon in such a manner that the sheet is not separated from the drum surface during high speed rotation thereof. In its simplest form, such a system may comprise a roller mounted in parallel to the axis of the drum and extending the length thereof. Preferably, the roller is radially movable relative to the axis of the drum into and out of engagement with the sheet. Movement of the roller may be synchronized with the clamping of the leading edge of a sheet in a clamping slot of the drum, and the roller may then stay in engagement with the surface of the drum until the trailing edge of the sheet has been clamped in the other slot of the drum. Thereafter, the roller may be moved out of engagement with the sheet.

Accordingly, a principal object of the present invention is to provide an improved sheet clamping system for high speed drums which is simply actuated, effective to limit radial displacement of the sheet under centrifugal forces incurred at high drum rotational speeds by providing means effective to retain the tangential position of the leading and trailing edges of the sheet, and which may be operated during sheet loading and unloading operations by means supported off the ends of the drum.

Other objects and further scope of applicability of the present invention will become apparent from the detailed description to follow taken in conjunction with the accompanying drawings in which like parts are designated by like reference characters.

DESCRIPTION OF THE PREFERRED EMBODIMENT

Figure 1:
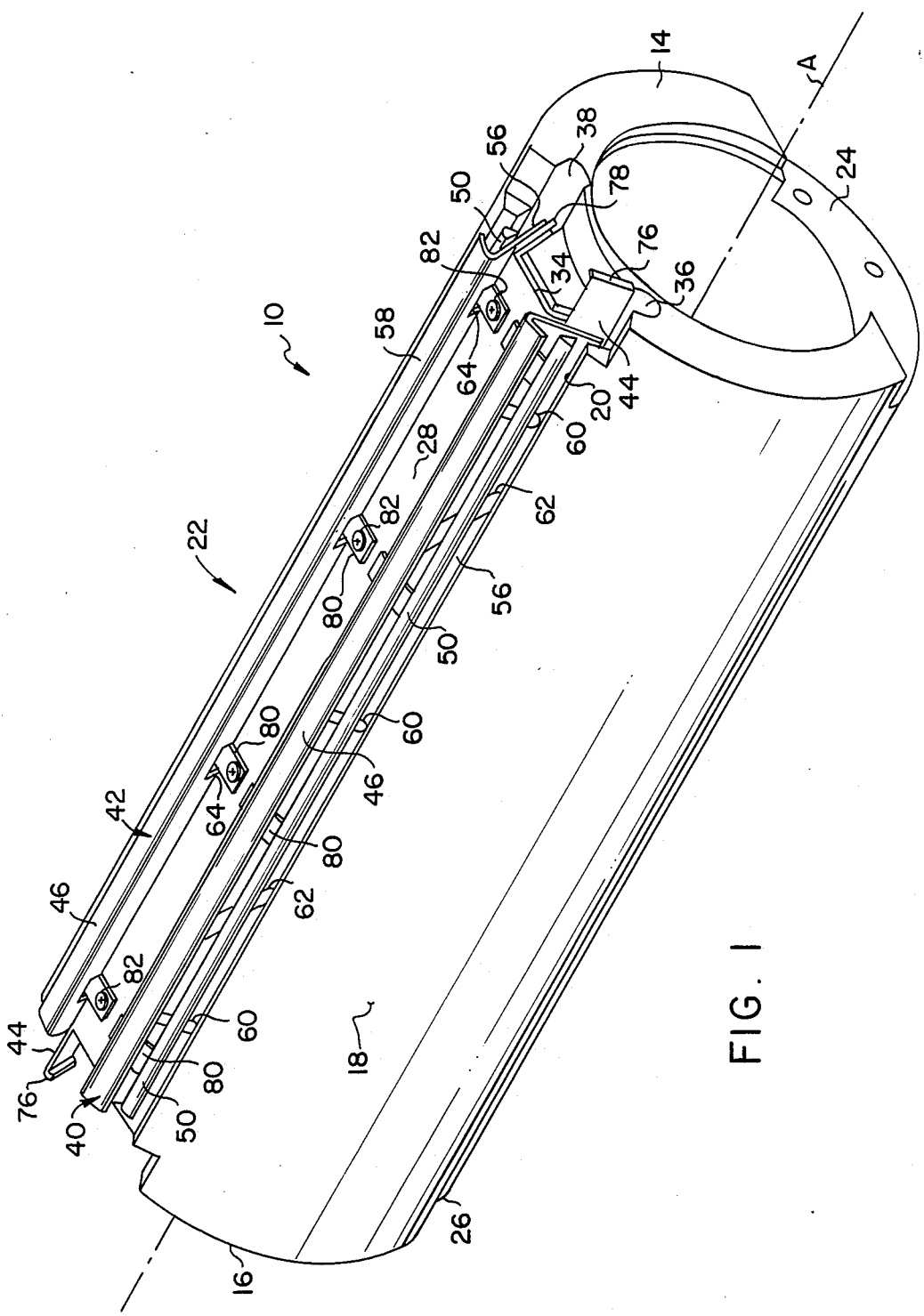
FIG. 1 is a perspective view illustrating a high speed sheet handling drum incorporating the clamping system of the present invention.

In. FIG. 1 of the drawings, an exemplary high speed sheet handling drum incorporating the sheet clamping system of the present invention is generally designated by the reference numeral 10 and rotates about a longitudinal axis A. The drum 10 has a pair of radial end faces 14 and 16 and a precision formed cylindrical outer surface 18 interrupted by an axially extending opening 20 which accommodates the sheet medium clamping system 22 of the present invention. Each of the end faces 14 and 16 includes a recess 24 and 26, respectively, for mounting counterbalancing weights (not shown) diametrically opposite the clamping system 22.

The clamping system 22 includes an axially oriented mounting channel 28 having a pair of inwardly diverging flanges 30 and 32 and a common web 34 secured to the drum near the cylindrical periphery 18. At the opening 20, the drum 10 is formed with divergent slots 36 and 38 along its length to receive the diverging mounting channel flanges 30 and 32. The system 22 further includes two clamping assemblies designated generally by the reference numerals 40 and 42, respectively. Each of the clamping assemblies, in turn, includes an axially slidable actuating bar 44 and a radially adjustable clamping bar 46 secured by headed pins 48 (FIGS. 2 and 3) to each of the flanges 30 and 32. Each of the clamping bars 46 cooperates with a respective centrifugal force responsive clamping rod 50 to clamp the leading and trailing edges of a sheet (not shown) to the drum 10 as is described in greater detail below.

Since the actuating bar 44, clamping bar 46, and headed pins 48 of each of the clamping assemblies 40 and 42 are of identical construction and, as such, designated by like reference characters, only the clamping assembly 40 will be described in detail below. It is understood that the clamping system 22 of the present invention incorporates both clamping assemblies 40 and 42 which cooperate with respective clamping rods 50 and are attached to the mounting channel 28 with the clamping assemblies in reversed orientation with respect to one another and, thus, facing in opposite directions. The actuating bars 44, clamping bars 46, and the channel member 28 are made from light-weight, relatively thin metal sheet stock. Because each of the clamping assemblies 40 and 42 are formed of identical components, the weight of the clamping system 22 is evenly distributed about the midline of the channel member 28. As such, balancing of the drum 10 is facilitated.

Figure 2:
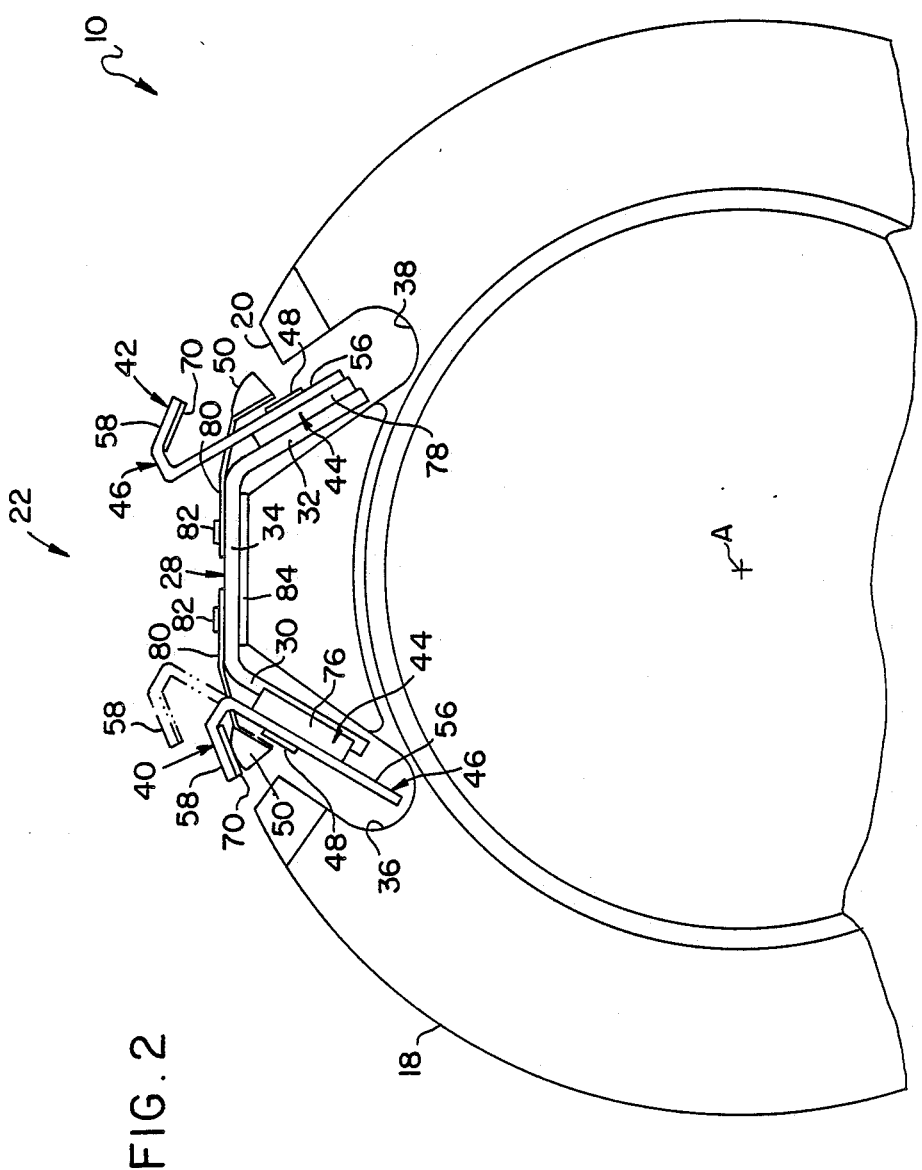
FIG. 2 is an enlarged fragmentary end elevation of the clamping system shown in FIG. 1.
Figure 3:
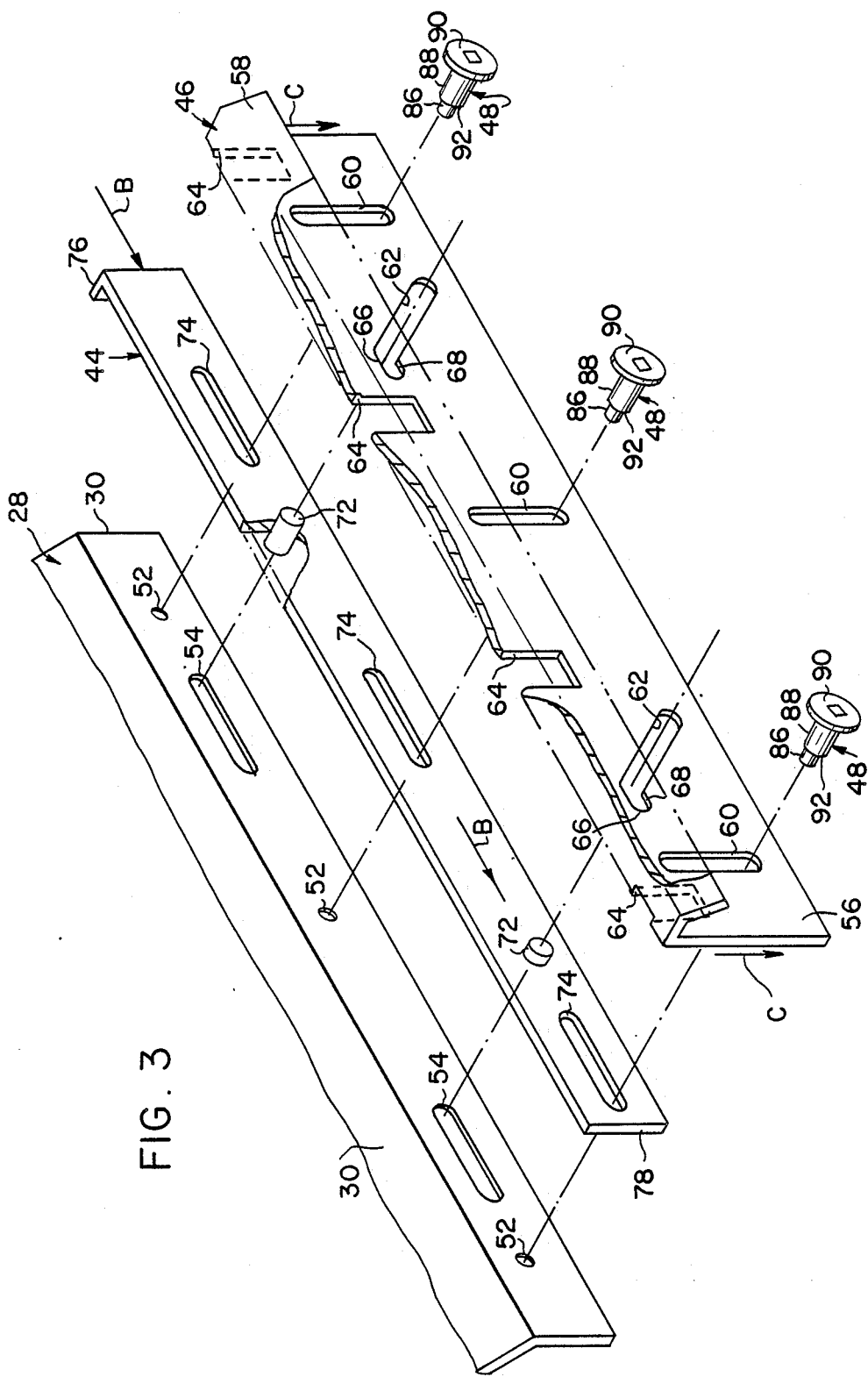
FIG. 3 is an exploded perspective view illustrating the relationship of components incorporated in the clamping system shown in FIG. 1.

As shown most clearly in FIG. 3 of the drawings, the inclined flange 30 of the channel member 28 has a plurality of cylindrical, threaded openings 52 and a pair of axial, elongate guide slots 54. The clamping bar 46 has a planar support web 56 and an inclined clamping lip 58 extending at an acute angle therefrom. The support web 56 includes a plurality of radial slots 60, inclined cam slots 62 and rectangular apertures 64. Each of the inclined cam slots 62 has an axially extending upper end 66 which provides a flat 68 at the top end of each of the cam slots. The lower surface of the clamping lip 58 is covered with a friction enhancing sheet media contacting material 70 (FIG. 2). The undersurface 70 of the clamping lip 58 is selected from a variety of materials depending on the particular sheet medium being used. Any resiliency in the material forming the surface 70 serves to reduce damage to the edge of sheet media otherwise due to compression of the sheet media between the clamping rod 50 and the clamping lip 58.

The actuating bar 44 carries a pair of transverse pins 72 which engage the axial guide slots 54 in the inclined flange 30 and the inclined cam slots 62 in the clamping bar 46. The actuating bar 44 also has a plurality of axial slots 74 corresponding to the threaded openings 52 in the inclined flange 30 and the radial slots 60 in the clamping bar 46. The actuating bar 44 has one end bent to provide a right angle tab 76 and an opposite straight end 78. The clamping rod 50 is shown to be attached to the common web 34 of the rigid support member 28 by a plurality of resilient leaf spring elements 80 which pass through the apertures 64 (FIG. 3) in the clamping bar 46. Of course, other means, such as pivoted arms (not shown) allowing movement of the rod 50, may be used instead of the springs 80.

In FIG. 1 of the drawings, the clamping bar 46 is shown in an extended sheet medium leading or trailing edge loading position. In this position, the clamping lip 58 extending from the planar web 56 of the clamping bar 46 is spaced from the upper surface of the associated clamping rod 50 by an amount sufficient to allow the insertion of the edge of a sheet therebetween. When the clamping bar 46 is in this sheet loading position, the tab 76 of the actuating bar 44 is located beyond the lateral end 14 of the drum 10.

Once inserted into the gap formed by the extended clamping bar 46 and the clamping rod 50 (see FIG. 2), which may be accomplished by the edge of the sheet 11 being pushed into the gap at a speed in excess of the rotation (arrow B) of the drum 10, the clamping bar 46 is lowered into clamping engagement with the edge of the sheet 11.

At substantially the same time a roller 19 being of substantially the same length as the drum 10 and being preferably coated with an elastomeric material is moved into engagement with the sheet 11 to press it into intimate contact with the cylindrical outer surface 18 of the drum 10 during the rotation thereof. While shown to be mounted for idling on a pair of arms 21 which are pivotable between a rest position shown in phantom (FIG. 2) and an operative position shown relative to the drum 10, the roller 19 may be suspended in any other manner permitting its movement toward and away from the drum 10. At the end of a rotation of the drum 10 the trailing edge of the sheet 11 is pushed into the gap formed by the other clamping bar 46 and clamping rod 50 shown to the right of the clamping arrangement just described. The roller 19 may then be withdrawn from contact with the sheet 11.

In FIG. 2 of the drawings, the clamping bar 46 of the clamping assembly 40 is moved from the extended sheet medium receiving position shown in phantom lines to a fully retracted clamping position shown in solid lines. The clamping bar 46 is retracted in response to movement of the actuating bar 44 from an axially extended position as shown in FIG. 1 to an axially depressed position, to be described in more detail below, but in which the tab 76 of the actuating bar 44 is adjacent one end of the inclined flange 30 of the channel member 28 and the opposite end 78 (FIG. 3) of the actuating bar 44 extends beyond the opposite end of the inclined flange 30 of the channel member 28.

Even though the particular mechanism for axially moving each of the actuating bars 44 is not part of the present invention, it will be appreciated that the tabs 76 provide for the use of push-pull mechanisms located adjacent, but not mounted on, the ends 14 and 16 of the drum 10. Since the drum 10 need not carry the mechanisms for axially moving the actuating bars 44, the dynamic stability of the drum is enhanced. Such push-pull mechanisms would be mounted adjacent the ends 14 and 16 of the drum 10 opposite the ends of the clamping system 22 when the drum 10 is in the sheet loading orientation shown in FIG. 1. The ends of the channel member 28, clamping bars 46, and clamping rods 50 are recessed with respect to the radial end faces 14 and 16 of the drum 10 to provide adequate access to the tabs 76 (FIG. 1).

With reference to FIGS. 1 and 2 of the drawings, the clamping system 22 is attached to the drum 10 by a plurality of fastener elements 82, such as counter sunk screw fasteners or rivets. Each fastener 82 extends through one of the leaf spring elements 80, the common web 34 of the channel member 28, a spacer 84, and into the drum. The height of the spacer 84 is chosen to compensate for the thickness of the particular sheet medium to be used and for manufacturing tolerances. The spacer 84 ensures that when the clamping bars 46 are in the retracted clamping position, the clamping lip undersurfaces 70 are tangent to the substantially cylindrical periphery of the sheet medium wrapped around the drum. As such, the edges of clamped sheet medium are not bent.

In FIG. 3 of the drawings, the inclined flange 30, actuating bar 44 and clamping bar 46 of the clamping assembly 40 are separated in order to show the arrangement of cam slots and pins which provide for axial movement of the actuating bar 44 and radial extension and retraction of the clamping bar 46. It being understood that in use the actuating bar 44 and clamping bar 46 are attached to the inclined flange 30 by the headed pins 48 as shown in FIG. 2. Each of the headed pins 48 has a threaded end 86, a cylindrical shaft 88 and a flat head 90. The diameter of the threaded end 86 of each of the pins 48 is less than that of the shaft 88 so that a shoulder 92 is formed at the junction of the threaded end 86 with the shaft 88. Since the actuating bar 44 and clamping bar 46 of the clamping assembly 40 are of identical construction to the actuating bar 44 and clamping bar 46 of clamping assembly 42, FIG. 3 and the description to follow provide a full understanding of the assembly and actuation of both clamping assemblies 40 and 42. Each of the elongate axial guide slots 54 of the inclined flange 30 is dimensioned to receive one end of one of the transverse pins 72 extending from the actuating bar 44. The other end of each of the pins 72 extends from the front surface of the actuating bar 44 and is received within one of the inclined cam slots 62 in the clamping bar 46. Each of the three threaded openings 52 in the inclined flange 30 is adapted to receive the threaded end 86 of one of the headed pins 48.

Each of the cylindrical shafts 88 of the pins 48 is received within one of the axial slots 74 in the actuating bar 44 and one of the radial slots 60 in the clamping bar 46. Each of the pin shafts 88 has a sufficient length to allow for radial sliding movement of the clamping bar 46 and axial movement of the actuating bar 44 between the inclined flange 30 and flat heads 90 of the pins 48. The length of each of the cylindrical shafts 88 is substantially equal to the combined widths of the actuating bar 44 and clamping bar 46 so that the ends of the pins 72 remain in the guide slots 54 and cam slots 62. Further, when the clamping assembly 40 is assembled, the threaded end 86 of each of the pins 48 is fully received in one of the openings 52 so that the shoulder 92 on each of the pins 48 abuts the inclined flange 30, and each of the pin heads 90 abut the support web 56 of the clamping bar 46.

The axial slots 54 and 74 and the corresponding pins 48 and 72 limit the actuating bar 44 to only axial movement. The radial slots 60 and pins 48 limit the clamping bar 46 to move radially only. The radial travel of the clamping bar 46 is limited by the vertical reach of the radial slots 60 and the inclined cam slots 62.

The clamping bar 46 is retracted from the extended sheet loading position (FIGS. 1 and 3) to the retracted sheet clamping position (FIG. 2) in response to axial movement of the actuating bar 44 in the direction indicated by the arrow B in FIG. 3. Since the clamping bar 46 is prevented from moving axially by the radial slots 60 and pins 48, axial movement of the pins 72 within the inclined ca slots 62 forces the clamping bar 46 to move downward in the radial direction shown by the arrows C in FIG. 3. In this manner, each of the pins 72 moves from the right hand end to the left hand end of the slots 54 and at the same time from the bottom to the top of each of the inclined slots 62. When each of the pins 72 abut the left hand end of one of the axial slots 54, each of the shafts 88 of the headed pins 48 abut the right hand end of one of the axial slots 74.

The axially extending upper end 66 of each of the inclined cam slots 62 facilitates locking the clamping bar 46 in the retracted sheet clamping position shown in FIG. 2 in the following manner. When the clamping bar 46 is in the retracted sheet clamping position shown in FIG. 2, each of the flats 68 is biased against the lower surface of one of the pins 72 by a radial force exerted by the clamping rod 50 to the undersurface of the clamping lip 58. As such, the clamping bar 46 is positively locked in the sheet clamping position. During rotation of the drum 10 at high speeds, such as 1500–6000 rpm, the positive locking force between each of the flats 68 and one of the pins 72 increases due to centrifugal forces tending to force the clamping bar 46 radially upward and the clamping rod 50 up against the sheet medium and clamping lip 58. The leaf springs 80 allow the clamping rod 50 to move radially outwardly under the influence of centrifugal force.

The fact that the clamping bar 46 is positively locked in the sheet clamping position (FIG. 2) at more than one location along its length ensures that the clamping system 22 is dynamically stable. During high speed rotation of the drum 10, the clamping system 22 is virtually static since the channel member 28 is rigidly attached to the drum, the clamping bars 46 and actuating bars 44 are locked in position, and radial travel of the clamping rods 50 is limited by the clamping lips 58. As such, dynamic movement of the clamping system during high speed rotation is limited to the radial movement of the clamping rods 50 allowed by compression of the sheet contacting surfaces 70 and by any elastic deflection of the clamp assembly. This limited radial movement of the clamping rods 50 provides for a sheet medium clamping force which is proportional to the speed of drum rotation and resulting centrifugal force on the sheet medium.

With reference again to FIGS. 1 and 2, the incline of the clamping assemblies 40 and 42 provides numerous advantages. First, the up and back, extended sheet loading position of the clamping bars 46 facilitates proper alignment of the leading edge of a sheet medium under one of the clamping lips 58. For example, when the leading edge of a sheet is fed up under the clamping lip 58 of the clamping bar 46 of the clamping assembly 40, it may or may not come into contact with the support web 56. During retraction of the clamping bar 46 to the sheet media clamping position shown in FIG. 2, the clamping lip 58 and upper end of the support web 56 not only move downward but also forward because the support web 56 lies in a chordal plane subtending an arc of less than 180° in the cylindrical periphery of the drum. This forward movement helps to ensure that the support web 56 contacts the edge of the sheet medium and aligns the sheet medium with respect to the clamping assembly 40.

Second, the incline of the clamping assemblies 40 and 42 allows the trailing edge of a sheet to fall radially against the upper surface of one of the clamping bars 50 without having to be bent in order to pass by one of the clamping lips 58. For example, after the leading edge of the sheet has been clamped in the clamping assembly 40, the drum 10 is rotated clockwise while the sheet is held against the peripheral surface 18 of the drum 10. The drum 10 is rotated until the trailing edge of the sheet falls radially down against the upper surface of the clamping bar 50 of the clamping assembly 42. Then, the actuating bar 44 of the clamping assembly 42 is depressed axially so that the clamping bar 46 retracts and clamps the trailing edge of the sheet between the clamping lip 58 and clamping rod 50 of the clamping assembly 42.

Third, the incline of the clamping assemblies 40 and 42 ensures that the clamping bars 46 and the actuating bars 44 and the inclined flanges 30 and 32 extend in a generally radial direction. Thus, bowing due to centrifugal forces acting on these components of the clamping assemblies 40 and 42 may be minimized. Further, the incline of the clamping assemblies makes provision for the clamping lip 58 to extend at an acute angle with respect to the support web 56. In this configuration, the clamping lip 58 resists bending or bowing due to centrifugal forces. This allows the channel member 28, clamping bars 46 and actuating bars 44 to be made of relatively thin, lightweight, metal sheet stock.

Thus it will be appreciated that as a result of the present invention, a dynamically stable and highly effective clamping system is provided. From the foregoing description and accompanying drawing illustrations it will be apparent to those skilled in the art that variations and/or modifications of the disclosed embodiment may be made without departure from the invention. Accordingly, it is expressly intended that the foregoing description and accompanying drawings are illustrative of a preferred embodiment only, not limiting, and that the true spirit and scope of the present invention be determined by reference to the appended claims.

We claim:

1. A clamping system for high speed sheet handling drum comprising:
   a light weight clamping bar having a generally planar support web and a clamping lip extending at an acute angle from the support web;
   means for mounting said clamping bar at axially spaced intervals along the length of the drum in a manner preventing axial but allowing limited radial movement with said support web lying in a chordal plane subtending an arc of less than 180° in the cylindrical periphery of the drum; and
   actuating means attached on said mounting means in a manner preventing radial but allowing limited axial movement, for moving said clamping bar from an extended sheet loading position in which said clamping lip is spaced from the cylindrical periphery of the drum to a retracted sheet clamping position in which said clamping lip is substantially tangent to the cylindrical periphery of the drum in response to axial movement of said actuating means.

2. The clamping system of claim 1, wherein said clamping bar and said actuating means together define a clamping assembly and said clamping system includes a pair of substantially identical clamping assemblies with each of said clamping assemblies being attached to said mounting means so as to face in opposite directions.

3. The clamping system of claim 2, wherein said mounting means comprises a mounting channel having a pair of inwardly diverging flanges joined at a common web to be secured to the drum.

4. The clamping system of claim 3, wherein each of said clamping assemblies is secured to a respective diverging mounting channel flange.

5. The clamping system of claim 4, wherein the drum includes divergent slots along its length for receiving the inwardly diverging flanges of the mounting channel and the clamping assemblies attached thereon.

6. The clamping system of claim 5, wherein said actuating means comprises a light weight actuating bar carrying transverse pins which engage spaced axial guide slots in the mounting channel flange and corresponding spaced axially inclined cam slots in the clamping bar of the same clamping assembly, whereby axial movement of the actuating bars operates to cam the clamping bars between operative retracted sheet clamping positions and radially extended positions for loading a sheet on the drum.

7. The clamping system of claim 6, wherein the clamping bar and actuating bar of each clamping assembly is secured to the respective mounting channel flange by a plurality of headed pins extending through axial slots in the actuating bar and radial slots in the clamping bar to limit the actuating bar to axial movement and the clamping bar to radial movement.

8. The clamping system of claim 7, wherein each of the inclined cam slots in the clamping bars includes an axially extending upper end which provides a flat surface for facilitating locking the clamping bars in operative retracted sheet clamping positions at axially spaced intervals along the length of the drum.

9. The clamping system of claim 8, further comprising:
centrifugal force response means positioned to underlie the clamping lip of each clamping bar in a manner such that leading and trailing edges of a retained sheet are sandwiched between the centrifugal force responsive means and the clamping lips under a clamping force generally proportional to drum rotation speeds squared.

10. The clamping system of claim 9, wherein said centrifugal force responsive means comprises centrifugal force responsive rods supported by means allowing radial movement of said rods and attached to the common web of the mounting channel and extending through apertures in the clamping bars in a manner supporting the rods under the clamping lips of the clamping bars.

11. The clamping system of claim 10, wherein the flat surface of each of the inclined cam slots is biased against the lower surface of each of the transverse pins by forces created by the centrifugal force responsive rods acting against the undersurface of the clamping lip of each of the clamping bars.

12. The clamping system of claim 11, wherein the support means allowing radial movement of the force responsive rods are leaf springs.

13. The clamping system of claim 12, wherein in a relaxed position of the leaf springs, the rod surfaces lie substantially in the cylindrical periphery of the drum so that in the clamping position of the clamping bars, the clamping lips thereof lightly engage the rods.

14. The clamping system of claim 13, wherein said clamping bars, actuating bars and mounting channel are formed of light weight, relatively thin metal sheet stock.

* * * * *